United States Patent [19]
Thelander

[11] Patent Number: 5,373,144
[45] Date of Patent: Dec. 13, 1994

[54] IMPROVEMENTS IN INDUCTION HEATING DEVICE

[76] Inventor: Ulf Thelander, Skogsstigen 3, S-330 12 Forsheda, Sweden

[21] Appl. No.: 927,390
[22] PCT Filed: Mar. 20, 1991
[86] PCT No.: PCT/SE91/00212
  § 371 Date: Sep. 18, 1992
  § 102(e) Date: Sep. 18, 1992
[87] PCT Pub. No.: WO91/15093
  PCT Pub. Date: Oct. 3, 1991

[30] Foreign Application Priority Data

Mar. 20, 1990 [SE] Sweden ................. 9000989

[51] Int. Cl.$^5$ .............................. H05B 6/10
[52] U.S. Cl. ......................... 219/659; 219/635; 219/642; 219/658; 219/670
[58] Field of Search ............ 219/10.75, 10.79, 10.67, 219/10.73, 10.69, 10.61 R, 10.57, 658, 659, 670, 676, 672, 635, 642

[56] References Cited

U.S. PATENT DOCUMENTS

| | | | |
|---|---|---|---|
| 1,234,280 | 7/1917 | Burnett et al. | 219/10.79 |
| 1,335,453 | 3/1920 | Nilson | 219/10.79 |
| 1,610,041 | 12/1926 | Cope | 219/10.79 |
| 4,237,359 | 12/1980 | Roth | 219/658 |
| 4,359,620 | 11/1982 | Keller | 219/10.73 |
| 4,708,325 | 11/1987 | Georges | 219/10.79 |
| 4,857,689 | 8/1989 | Lee | 219/658 |
| 4,978,825 | 12/1990 | Schmidt et al. | 219/10.73 |
| 5,025,124 | 6/1991 | Alfredeen | 219/10.75 |

Primary Examiner—Philip H. Leung
Attorney, Agent, or Firm—Howson and Howson

[57] ABSTRACT

A heating device for heating objects, such as moulding tools for preheating them, removing rubber, to produce shrink fit operations and other treatments of objects (11, 12, 13) which consist, at least partly, of metal, the device comprising a core (2) of electric conductive material and at least a coil (3, 4) which is arranged around the core (2) and connected to a current source (20) to generate a magnetic field, the flux of which is intended to follow the said core. The core (2) has two poles (5, 6), between which a space (7) can exist to supply objects (11, 12, 13) to the device (1) for heating treatment. One of the poles or both said poles (5, 6) are arranged to be able to be displaced in such a way that the core (2) can be closed or closed with an object (11, 12, 13) supplied and located between the poles (5, 6) for heating or treatment. A table (14) is arranged around the core (2) or one pole (6) of the core to unload the core (2) from loadings from an object (12, 13). The table (14), which comprises a non-conducting material, can be arranged vertically adjustable and show a frame consisting of partly electric conductive material, partly non-conducting material.

6 Claims, 3 Drawing Sheets

IMPROVEMENTS IN INDUCTION HEATING DEVICE

This invention relates to a device for heating objects, consisting at least partly of metal. The device comprises a core, and at least one coil connectable to a source of current to induce a magnetic flux in the core. The device has utility, for example in the rubber industry, for preheating molds, where it is capable of considerably reducing the time required for preheating. It is useful in preheating metal parts included in other objects, and can be used for derubberizing, i.e. separating rubber from metal, in objects consisting of both rubber and metal. The device is also useful in shrink fitting metal objects.

In heating devices of this kind, there is a need for simplification, for reduction of leakage of magnetic flux, for ensuring against unintended induced currents, for reduction of heat loss, and for relieving the magnetic core from the load of heavy objects to be heated.

In previously known induction heating devices, the objects to be heated were supported by the poles of the magnetic core. That is, the object to be heated was placed between the poles of the core, and, simultaneously, a coil was arranged around the end portions of the poles of the core. One problem with this arrangement was that the core had to support the load imposed by the object to be heated. Another problem was that it was difficult to place the object in the device, because the coil impeded access to the space between the poles of the core. Still another problem was that the prior induction heating devices were incapable of handling large and/or heavy objects satisfactorily. Still another problem was that known devices were subject to heat loss and leakage flux.

SUMMARY OF THE INVENTION

The general object of this invention is to provide an induction heating device having all of the essential capabilities, but which eliminates the inconveniences encountered in the prior art. A particular object of the invention is to provide for the heating of heavy and voluminous objects by eliminating the loading of the core by the objects to be heated. Another object is to reduce heating losses by effecting improved contact between different parts of the core. Still another object is to make it easier to place objects to be heated or treated in position in the heating device. The foregoing objects are addressed by providing a table having a disc-shaped element of electrical insulating material, and by providing a core having a displaceable part.

In one embodiment of the invention, the table is disposed around a portion of the core. The table may be disposed around one of the poles of the core, e.g. the stationary pole, and has an opening through which the core extends.

In another embodiment, the table or disc-shaped element is arranged on a supporting frame consisting partly of metal, the metal part having a gap bridged by insulating material.

In another embodiment, the device comprises a press device arranged to press the displaceable part of the core against the stationary part of the core after the displaceable part has been moved to its intended operating position but before electrical current is supplied to the coil.

In a further embodiment, hoisting and supporting means are arranged around the core. The hoisting and supporting means may be arranged around one of the poles, e.g. the stationary pole, for elevation of the object to be heated from a table or conveyor which is adjacent to the poles of the core.

BRIEF DESCRIPTION OF THE DRAWING

Further characteristics and advantages of the invention will be apparent from the detailed description with reference to the drawings, in which.

DESCRIPTION OF THE PREFERRED EMBODIMENTS

Figure 1:
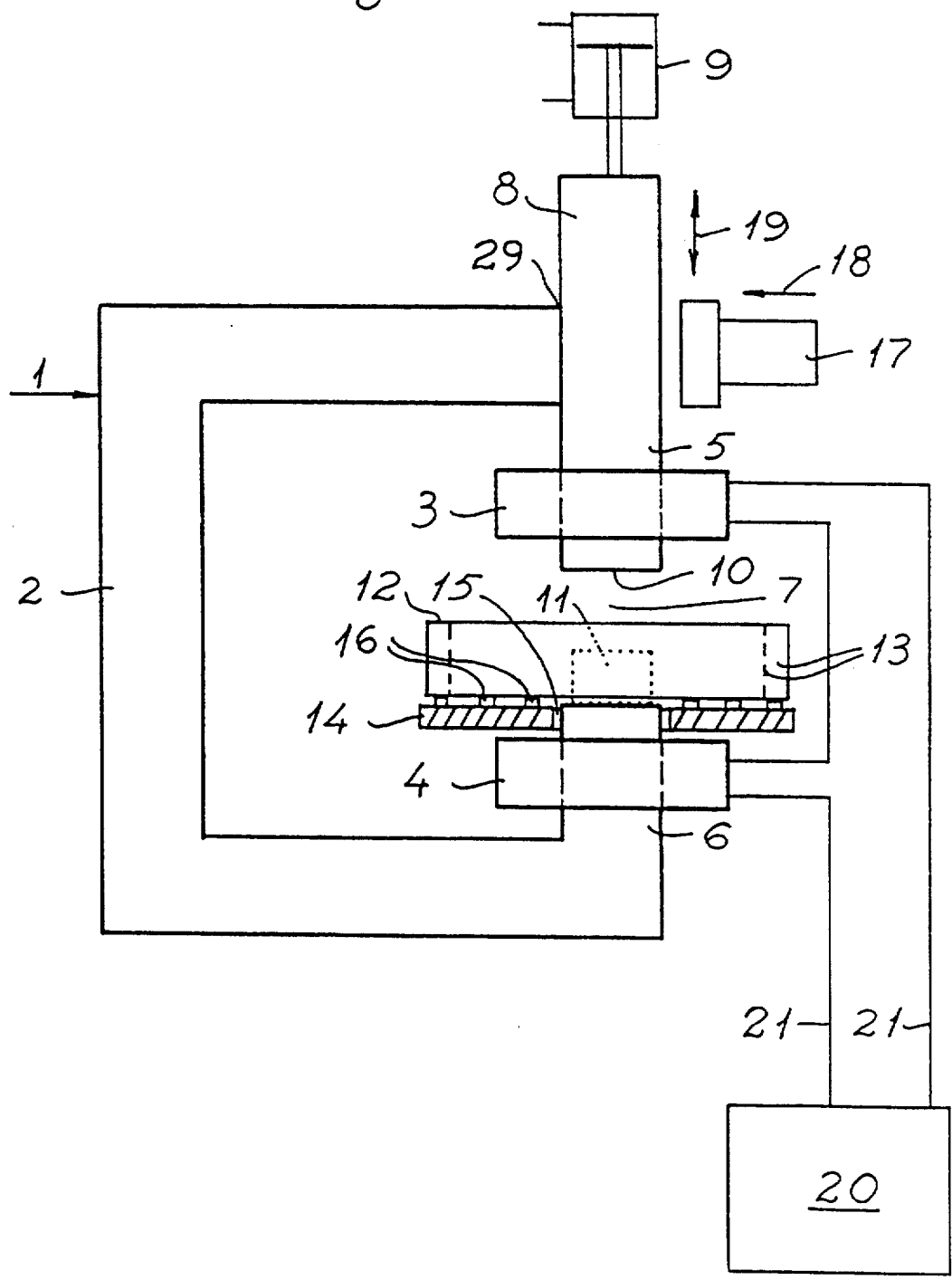
FIG. 1 is a schematic side elevational view of a device in accordance with one embodiment of the invention.

FIG. 1 shows a device 1 for heating objects 11, 12 or 13 to effect derubberizing, shrink fitting, or other operations on a workpiece. The device 1, comprises a core 2, which is capable of being arranged in a closed configuration with opposed poles 5 and 6. One or more coils are disposed around the core. In the device shown in FIG. 1, a coil 3 is provided on pole 5 and a coil 4 is provided on pole 6.

The gap 7 between poles 5 and 6 can be closed by bringing end surface 10 of pole 5 into engagement with the opposed end surface of pole 6. Alternatively, an object 11 can be arranged to bridge the gap between the poles. To effect adjustment of the gap, at least one of the poles is made displaceable. In the case of FIG. 1, pole 5 is a part of an element 8 of the core, which is displaceable by a pneumatic piston and cylinder unit 9.

The coils 3 and 4 are connected to an a.c. source 20 by wires 21, and form primary windings for induction of a magnetic field, the flux of which follows the core, and passes through any object, such as objects 11 or 12, arranged between the poles of the core.

If the object to be heated is small, such as object 11, or if an object such as object 12 is light in weight, it can be placed directly on the end surface of stationary pole 6. If an a bulkier object such as 12 or 13 is relatively heavy, it is supported on a table 14 consisting at least in part of electrical insulating material. The table 14 can comprise a plate-shaped element having an opening 15 through which the stationary pole 6 extends. Preferably, the opening 15 is in the center of the table. Rails 16 may be provided on the table to prevent unnecessary wear of the table.

The table 14 can be made vertically adjustable so that objects 12 and 13 can be placed at an appropriate level for magnetic connection to the core, while avoiding mechanical loading of the stationary pole 6.

A conveyor (not shown) can be arranged adjacent to the poles 5 and 6 to carry objects which are bulky, heavy, or otherwise difficult to handle, to the device 1, and to remove the objects after treatment. The ability of the table 14 to be raised and lowered is advantageous.

When heating an object, for example when preheating a molding tool, the object is placed on the table 14, at a suitable level in device 1. The poles 5 and 6 are brought into contact with the object so that the core 2 is magnetically short-circuited. More than one object can be heated at the same time.

In the case of derubberizing to separate polymeric materials from metal inserts, one or more objects are placed on table 14, and treated in a similar manner.

When heating a ring-shaped object, such as object 13, the object is placed on table 14 in a position such that a part of the core 2, preferably a part of one of poles 5 and 6, or parts of both poles, extend through the central opening of the ring-shaped object. The displaceability of part 8 of the core makes this possible. It is, of course, possible to construct the core in such a way that both poles are displaceable.

The hoisting apparatus (not shown), which is used to elevate an object such as object 13 from a conveyor to the vicinity of the poles of the core, can be pneumatically or hydraulically operated rods, extending through table 14, and displaceable from the level of the surface of table 14, or from the level of the object-supporting surface of rails 16, to a level above surface of the table. The rods, of course, can be displaceable from a level below the level of the surface of table 14, or from a level below the level of the object-supporting surface of rails 16. The object-supporting surfaces of the hoisting apparatus are provided with, or consist of, insulating material to minimize loss of heat to the foundation, especially where the foundation consists of metal or other material having high thermal conductivity.

To heat a ring-shaped object, such as a wearing ring or a wheel rim, the object is elevated by four hoisting devices arranged around the core. The core is closed by displacement of its part 8 to bring the end surface 10 of pole 5 into engagement with the opposed end surface of pole 6. The ring-shaped object then, in effect, forms a secondary winding, in which electrical current is induced. In the case of treatment of ring-shaped objects, the table 14 can be replaced by a conveyor.

Heating of a ring-shaped object, such as object 13, can be used to carry out shrink-fitting. For example a ring can be expanded by a few millimeters by heating. Then, a rim is positioned within the expanded ring, and the ring is allowed to cool so that it tightly fits the rim. The heating required to carry out this operation can be achieved within about ten minutes, as compared with the four to six hours required using a conventional furnace. The energy consumption is only one third of the energy consumption of conventional heating methods.

To attain improved contact between the displaceable part 8 and the remainder of the core, a pressing device 17 is used. The pressing device is arranged to press part 8 against an end of the other portion of the core to eliminate any space at joint 29. Thus, in the operation of the heating device, the displaceable part 8 is first brought to its operating position by pneumatic piston and cylinder unit 9, which moves part 18 in one or the other of the two directions indicated by double-ended arrow 19. Then, the pressing device 17 presses the displaceable part 8, in direction 18, against the end of the other portion of the core. This provides surface contact between the fixed and displaceable parts of the core and eliminates vibration of the displaceable part, which has been encountered in prior devices having displaceable core components.

Figure 2:
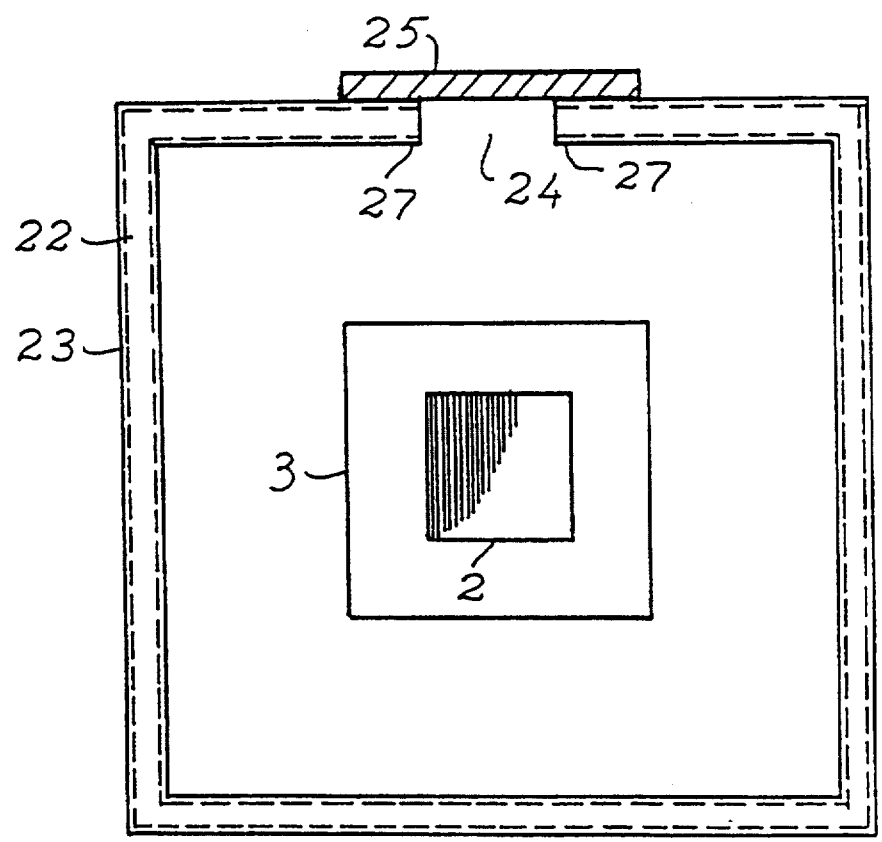
FIG. 2 is a top plan view showing a supporting frame in accordance with another embodiment of the invention.

Referring now to FIG. 2, the structure of a table is illustrated. The table comprises a frame 22 for supporting a plate-shaped element or insulating material. The supporting frame 22 consists in part of an element 23 of durable material such as sheet metal. Ordinarily, a metal frame, when disposed about a magnetic core, would form a secondary winding, in which an electrical current would be induced when the primary coils are energized. However, sheet metal element 23 is formed with a gap 24, between opposed ends 27. The gap is bridged by an element 25, which extends across gap 24, and which overlaps the sheet metal frame element. Element 25 consists of an electrical insulating material such as glass fiber-reinforced resin. The resin may be polyester, bakelite or other phenolic resin, or any of various other rigid, non-conductive materials.

The core 2 can be constructed of a laminate of sheets held together by a glue or varnish such as an insulating varnish based on rosin oil, polyamide or epoxy resin. The sheets can be made of silicon carbide.

Figure 3:
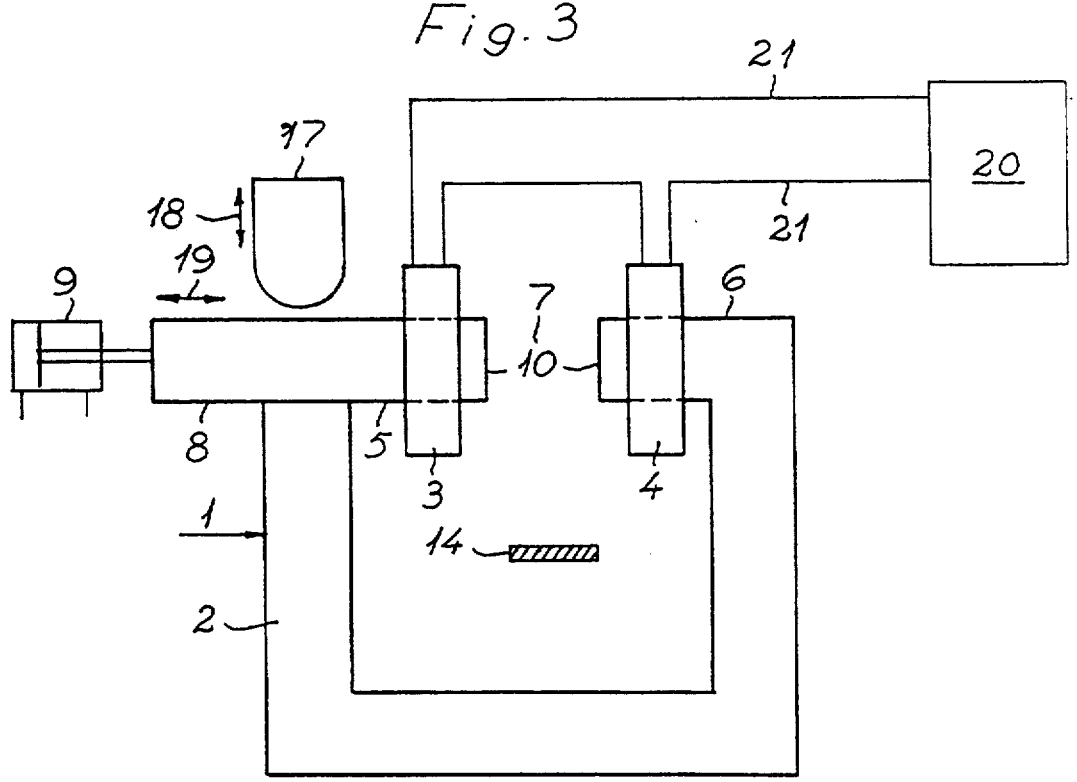
FIG. 3 is a schematic side elevational view of a device in accordance with still another embodiment of the invention.

FIG. 3 shows another embodiment, in which the poles 5 and 6 are situated at the top of the core rather than in one of the vertical parts. A table 14 is located at a level below the poles 5 and 6 of a core, and is displaceable toward the core in order to carry objects for treatment into the gap 7 between the poles. Preferably, the table 14 is capable of being displaced past the poles. The device of FIG. 3 is otherwise similar to the device of FIG. 1, and like reference numerals designate corresponding parts.

Figure 4:
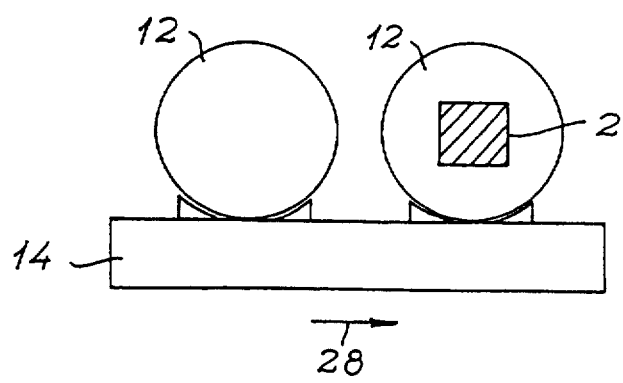
FIG. 4 is a side elevational view of a table in accordance with still another embodiment of the invention.

FIG. 4 shows an example of a displaceable table 14, carrying objects 12 to be heated. The table is displaceable in the direction indicated by arrow 28. The table is shown in a position such that one of the objects 12 is positioned within a gap between the poles of a core 2. When the heat treatment of the first object is completed, the table is moved further in the direction of arrow 28 to position the second object 12 between the poles of the core. Following treatment of the second object, the table 14 can be returned in the opposite direction, or moved further in the same direction so that the treated objects can be unloaded on the opposite side of the core.

The device in accordance with the invention has the advantages of short heating times, low cost, low maintenance cost, simplicity of construction and a small number of movable parts. The device provides for more effective control and adjustment, and for maintenance of more uniform quality in manufacturing operations. In operations such as the preheating of molding tools, shorter set-up times are achieved, and consequently optimum utilization of molding presses and similar machines can be achieved. By derubberizing using the device in accordance with the invention, it is possible to re-use the recovered metal parts. The device also provides an improved working environment, since the process is clean, and only the objects to be heated, not the surroundings, are heated. The device makes it possible to exchange tools in a machine or press on short notice. For example, in a test, a tool unit comprising a tool with a ring and a bed with a weight of nearly 200 kilos, was heated to 450° C. in 15 minutes. Heating of the same tool unit in a hot blast furnace consumes a time of four to six hours.

Various modifications can be made to the apparatus described. For example, in some cases it is not necessary, or may not be possible, to close the gap of the core, yet satisfactory heating can be achieved. The poles can be stationary in some cases, and displaceable in others. One or both poles can be made displaceable.

Instead of providing a table around the core, a conventional conveyor having metal rollers can be used in conjunction with a hoist for hoisting the object to be heated from the conveyor. The hoist can be located either beneath the conveyor, or around the core.

A table consisting of insulating material can be provided with metal rails to resist wear. The table can be stationary or vertically adjustable.

A table which is displaceable along a path below the poles of the core can be used to support multiple objects, especially objects having shapes which make them difficult to handle.

In the case of shrink-fitting operations, hoists and storage devices can be provided in conjunction with the heating device for hoisting and storing the parts which are to be fitted to the heated part.

The coil can be located around the gap between the poles of the core, as this is the best location for the coil in many cases. The coil, when adapted to be located in this position, is removable so that it is possible to supply workpieces to the gap between the poles of the core. The coil can also be made interchangeable with other coils having other dimensions or diameters, to adapt the heating device for the treatment of objects of various shapes and dimensions, and to provide for more effective control of the heating process. Multiple coils, e.g. more than two coils, can be used.

These and other modifications can be made without departing from the scope of the invention as defined by the following claims.

I claim:

1. An induction heating device comprising a C-shaped magnet core having a gap for receiving an object to be heated, at least one coil surrounding a portion of said core, and means, comprising a current source connected to said coil, for energizing the coil and thereby causing a magnetic flux to be induced in said core, wherein said core comprises a fixed portion, and a displaceable portion slidable relative to the fixed portion in a direction such that sliding movement of the displaceable portion effects adjustment of the size of said gap, wherein the improvement comprises clamping means for applying a force to press the displaceable portion of the core against the fixed portion of the core when the gap is adjusted to any desired size, said clamping means being operable to release said pressing force to permit adjustment of the gap, whereby, the size of the gap can be readily adjusted, and good contact can be maintained between the fixed and displaceable parts of the core when the coil is energized, regardless of the gap size.

2. An induction heating device comprising a C-shaped magnet core having a gap for receiving an object to be heated, at least one coil surrounding a portion of said core, and means, comprising a current source connected to said coil for energizing the coil and thereby causing a magnetic flux to be induced in said core, wherein said core comprises a fixed portion, and a displaceable portion slidable relative to the fixed portion in a direction such that sliding movement of the displaceable portion effects adjustment of the size of said gap, wherein the improvement comprises clamping means for applying a force to press the displaceable portion of the core against the fixed portion of the core when the gap is adjusted to a desired size, said clamping means being operable to release said pressing force to permit adjustment of the gap, whereby, the size of the gap can be readily adjusted, and good contact can be maintained between the fixed and displaceable parts of the core when the coil is energized, said heating device including means, comprising a work-supporting table of electrical insulating material surrounding a portion of said core adjacent to said gap in the core for supporting a workpiece to be heated, and frame means for supporting said table, said frame means comprising a metal member partly surrounding the core, the metal member having ends separated from each other by a gap so that the metal member only partly surrounds the core.

3. An induction heating device comprising a C-shaped magnet core having a gap for receiving an object to be heated, at least one coil surrounding a portion of said core, means, comprising a current source connected to said coil, for energizing the coil and thereby causing a magnetic flux to be induced in said core, means, comprising a work-supporting table of electrical insulating material surrounding a portion of said core adjacent to said gap in the core, for supporting a workpiece to be heated, and frame means for supporting said table, said frame means comprising a metal member partly surrounding the core, the metal member having ends separated from each other by a gap so that the metal member only partly surrounds the core.

4. An induction heating device according to claim 3 in which said frame means includes an electrical insulating member bridging the gap between the ends of said metal member.

5. An induction heating device according to claim 3 in which the work-supporting table is vertically adjustable.

6. An induction heating device according to claim 3 which said means for supporting a workpiece to be heated includes means for hoisting a workpiece on said work-supporting table to the location of said gap.

* * * * *